(12) United States Patent
Franco et al.

(10) Patent No.: US 8,078,740 B2
(45) Date of Patent: Dec. 13, 2011

(54) RUNNING INTERNET APPLICATIONS WITH LOW RIGHTS

(75) Inventors: Roberto A. Franco, Seattle, WA (US); Anantha P Ganjam, Sammamish, WA (US); John G. Bedworth, Redmond, WA (US); Peter T. Brundrett, Seattle, WA (US); Roland K Tokumi, Issaquah, WA (US)

(73) Assignee: Microsoft Corporation, Redmond, CA (US)

( * ) Notice: Subject to any disclaimer, the term of this patent is extended or adjusted under 35 U.S.C. 154(b) by 883 days.

(21) Appl. No.: 11/145,530

(22) Filed: Jun. 3, 2005

(65) Prior Publication Data
US 2006/0277218 A1    Dec. 7, 2006

(51) Int. Cl.
*G06F 15/16* (2006.01)
(52) U.S. Cl. ........................................................ 709/229
(58) Field of Classification Search .................. 709/229
See application file for complete search history.

(56) References Cited

U.S. PATENT DOCUMENTS

| | | | |
|---|---|---|---|
| 4,227,253 A | 10/1980 | Ehrsam et al. | |
| 4,984,272 A | 1/1991 | McIlroy et al. | |
| 5,210,874 A | 5/1993 | Karger | |
| 5,339,422 A | 8/1994 | Brender et al. | |
| 5,377,188 A | 12/1994 | Seki | |
| 5,428,529 A | 6/1995 | Hartrick et al. | |
| 5,623,604 A | 4/1997 | Russell et al. | |
| 5,659,539 A | 8/1997 | Porter et al. | |
| 5,666,519 A | 9/1997 | Hayden | |
| 5,675,762 A | 10/1997 | Bodin et al. | |
| 5,729,710 A | 3/1998 | Magee et al. | |
| 5,758,093 A | 5/1998 | Boezeman et al. | |
| 5,760,767 A | 6/1998 | Shore et al. | |
| 5,771,383 A | 6/1998 | Magee et al. | |
| 5,799,090 A | 8/1998 | Angert | |
| 5,812,394 A | 9/1998 | Lewis et al. | |
| 5,852,435 A | 12/1998 | Vigneaux et al. | |
| 5,892,904 A * | 4/1999 | Atkinson et al. | 726/22 |
| 5,931,900 A | 8/1999 | Notani et al. | |
| 5,941,947 A | 8/1999 | Brown et al. | |
| 5,949,882 A * | 9/1999 | Angelo | 713/185 |
| 5,974,549 A | 10/1999 | Golan | |
| 5,983,348 A | 11/1999 | Ji | |
| 5,987,523 A | 11/1999 | Hind et al. | |

(Continued)

FOREIGN PATENT DOCUMENTS

CN    1299478    6/2001

(Continued)

OTHER PUBLICATIONS

Sandboxie; Overview, retrieved from the Internet on Aug. 17, 2005: http://www.sandboxie.com/, 3 pages.

(Continued)

*Primary Examiner* — Phuoc Nguyen
*Assistant Examiner* — June Sison (57) ABSTRACT

In various embodiments, applications that are configured to interact with the Internet in some way are executed in a restricted process with a reduced privilege level that can prohibit the application from accessing portions of an associated computing device. For example, in some embodiments, the restricted process can prohibit applications from read and write access to portions of a system's computer-readable media, such as the hard disk, that contains administrative data and settings information and user data and settings. In these embodiments, a special portion of the disk, termed a "containment zone", is designated and used by applications in this restricted process.

16 Claims, 6 Drawing Sheets

U.S. PATENT DOCUMENTS

| | | | |
|---|---|---|---|
| 5,987,611 A | 11/1999 | Freund |
| 5,995,945 A | 11/1999 | Notani et al. |
| 6,006,228 A | 12/1999 | McCollum et al. |
| 6,029,245 A | 2/2000 | Scanlan |
| 6,041,309 A | 3/2000 | Laor |
| 6,076,109 A | 6/2000 | Kikinis |
| 6,092,194 A | 7/2000 | Touboul |
| 6,154,844 A | 11/2000 | Touboul et al. |
| 6,158,007 A | 12/2000 | Moreh et al. |
| 6,161,139 A | 12/2000 | Win et al. |
| 6,253,326 B1 | 6/2001 | Lincke et al. |
| 6,266,681 B1 | 7/2001 | Guthrie |
| 6,272,641 B1 | 8/2001 | Ji |
| 6,275,937 B1 | 8/2001 | Hailpern et al. |
| 6,275,938 B1 | 8/2001 | Bond et al. |
| 6,279,111 B1 * | 8/2001 | Jensenworth et al. | 726/10 |
| 6,311,269 B2 | 10/2001 | Luckenbaugh et al. |
| 6,321,334 B1 | 11/2001 | Jerger et al. |
| 6,332,147 B1 | 12/2001 | Moran et al. |
| 6,339,423 B1 | 1/2002 | Sampson et al. |
| 6,343,362 B1 | 1/2002 | Ptacek et al. |
| 6,345,361 B1 | 2/2002 | Jerger et al. |
| 6,351,816 B1 | 2/2002 | Mueller et al. |
| 6,366,912 B1 | 4/2002 | Wallent et al. |
| 6,385,301 B1 | 5/2002 | Nolting et al. |
| 6,430,561 B1 | 8/2002 | Austel et al. |
| 6,457,130 B2 | 9/2002 | Hitz et al. |
| 6,460,079 B1 | 10/2002 | Blumenau |
| 6,473,800 B1 | 10/2002 | Jerger et al. |
| 6,490,626 B1 | 12/2002 | Edwards et al. |
| 6,516,308 B1 | 2/2003 | Cohen |
| 6,519,647 B1 | 2/2003 | Howard et al. |
| 6,526,513 B1 | 2/2003 | Shrader et al. |
| 6,546,546 B1 | 4/2003 | Van Doorn |
| 6,553,393 B1 | 4/2003 | Eilbott et al. |
| 6,553,410 B2 | 4/2003 | Kikinis |
| 6,584,186 B1 | 6/2003 | Aravamudan et al. |
| 6,591,265 B1 | 7/2003 | Erickson et al. |
| 6,594,664 B1 | 7/2003 | Estrada et al. |
| 6,598,046 B1 | 7/2003 | Goldberg et al. |
| 6,601,233 B1 | 7/2003 | Underwood |
| 6,609,198 B1 | 8/2003 | Wood et al. |
| 6,629,081 B1 | 9/2003 | Cornelius et al. |
| 6,629,246 B1 | 9/2003 | Gadi |
| 6,636,889 B1 | 10/2003 | Estrada et al. |
| 6,636,972 B1 | 10/2003 | Ptacek et al. |
| 6,662,341 B1 | 12/2003 | Cooper et al. |
| 6,671,802 B1 | 12/2003 | Ott |
| 6,691,153 B1 | 2/2004 | Hanson et al. |
| 6,691,230 B1 | 2/2004 | Bardon |
| 6,701,376 B1 | 3/2004 | Haverstock et al. |
| 6,711,675 B1 | 3/2004 | Spiegel et al. |
| 6,724,406 B1 | 4/2004 | Kelley |
| 6,728,762 B1 | 4/2004 | Estrada et al. |
| 6,748,425 B1 | 6/2004 | Duffy et al. |
| 6,754,702 B1 | 6/2004 | Kennelly et al. |
| 6,772,167 B1 | 8/2004 | Snavely et al. |
| 6,772,345 B1 | 8/2004 | Shetty |
| 6,772,393 B1 | 8/2004 | Estrada et al. |
| 6,779,120 B1 | 8/2004 | Valente et al. |
| 6,785,790 B1 | 8/2004 | Christie et al. |
| 6,789,170 B1 | 9/2004 | Jacobs et al. |
| 6,789,204 B2 | 9/2004 | Abdelnur et al. |
| 6,792,113 B1 | 9/2004 | Ansell et al. |
| 6,799,208 B1 | 9/2004 | Sankaranarayan et al. |
| 6,801,224 B1 | 10/2004 | Lewallen et al. |
| 6,820,261 B1 | 11/2004 | Bloch |
| 6,823,433 B1 | 11/2004 | Barnes et al. |
| 6,826,716 B2 | 11/2004 | Mason |
| 6,850,252 B1 | 2/2005 | Hoffberg |
| 6,854,039 B1 | 2/2005 | Strongin et al. |
| 6,871,321 B2 | 3/2005 | Wakayama |
| 6,898,618 B1 | 5/2005 | Slaughter et al. |
| 6,898,705 B2 | 5/2005 | Abboud et al. |
| 6,931,532 B1 | 8/2005 | Davis et al. |
| 6,934,757 B1 | 8/2005 | Kalantar et al. |
| 6,941,459 B1 | 9/2005 | Hind et al. |
| 6,959,336 B2 | 10/2005 | Moreh et al. |
| 6,961,849 B1 | 11/2005 | Davis et al. |
| 6,978,367 B1 | 12/2005 | Hind et al. |
| 7,003,734 B1 | 2/2006 | Gardner et al. |
| 7,010,681 B1 | 3/2006 | Fletcher et al. |
| 7,051,366 B1 | 5/2006 | LaMacchia et al. |
| 7,051,368 B1 | 5/2006 | Howard et al. |
| 7,069,554 B1 | 6/2006 | Stammers et al. |
| 7,082,527 B2 | 7/2006 | Zimmer et al. |
| 7,082,572 B2 | 7/2006 | Pea et al. |
| 7,085,995 B2 | 8/2006 | Fukuda et al. |
| 7,093,244 B2 | 8/2006 | Lajoie et al. |
| 7,143,362 B2 | 11/2006 | Dieberger et al. |
| 7,185,210 B1 | 2/2007 | Faden |
| 7,188,363 B1 | 3/2007 | Boutros et al. |
| 7,191,252 B2 | 3/2007 | Redlich et al. |
| 7,194,744 B2 | 3/2007 | Srivastava et al. |
| 7,203,749 B2 | 4/2007 | Hiraga |
| 7,213,051 B2 | 5/2007 | Zhu et al. |
| 7,240,015 B1 | 7/2007 | Karmouch et al. |
| 7,263,561 B1 | 8/2007 | Green et al. |
| 7,275,152 B2 | 9/2007 | Goud et al. |
| 7,281,132 B2 | 10/2007 | Bender et al. |
| 7,308,648 B1 | 12/2007 | Buchthal et al. |
| 7,318,238 B2 | 1/2008 | Elvanoglu et al. |
| 7,328,435 B2 | 2/2008 | Trifon |
| 7,343,626 B1 | 3/2008 | Gallagher |
| 7,392,545 B1 | 6/2008 | Weber et al. |
| 7,398,533 B1 | 7/2008 | Slaughter et al. |
| 7,406,502 B1 | 7/2008 | Oliver et al. |
| 7,475,404 B2 | 1/2009 | Hamel |
| 7,478,434 B1 | 1/2009 | Hinton et al. |
| 7,480,907 B1 | 1/2009 | Marolia et al. |
| 7,562,382 B2 | 7/2009 | Hinton et al. |
| 7,600,224 B2 | 10/2009 | Obayashi et al. |
| 7,640,434 B2 | 12/2009 | Lee et al. |
| 7,650,617 B2 | 1/2010 | Hoshino et al. |
| 7,729,992 B2 | 6/2010 | Rose |
| 7,792,964 B2 | 9/2010 | Franco |
| 2001/0013096 A1 | 8/2001 | Luckenbaugh et al. |
| 2001/0016907 A1 | 8/2001 | Kang et al. |
| 2001/0039622 A1 | 11/2001 | Hitz et al. |
| 2001/0043237 A1 | 11/2001 | Schmieder |
| 2001/0049671 A1 | 12/2001 | Joerg |
| 2001/0054049 A1 | 12/2001 | Maeda et al. |
| 2002/0010679 A1 | 1/2002 | Felsher |
| 2002/0010855 A1 | 1/2002 | Reshef et al. |
| 2002/0019936 A1 | 2/2002 | Hitz et al. |
| 2002/0019941 A1 * | 2/2002 | Chan et al. | 713/185 |
| 2002/0046290 A1 | 4/2002 | Andersson et al. |
| 2002/0069200 A1 | 6/2002 | Cooper et al. |
| 2002/0073119 A1 | 6/2002 | Richard |
| 2002/0073197 A1 | 6/2002 | Bhogal et al. |
| 2002/0087479 A1 | 7/2002 | Malcolm |
| 2002/0099952 A1 * | 7/2002 | Lambert et al. | 713/200 |
| 2002/0104023 A1 | 8/2002 | Hewett et al. |
| 2002/0107889 A1 | 8/2002 | Stone et al. |
| 2002/0107890 A1 | 8/2002 | Gao et al. |
| 2002/0112155 A1 | 8/2002 | Martherus et al. |
| 2002/0124181 A1 | 9/2002 | Nambu |
| 2002/0129239 A1 | 9/2002 | Clark |
| 2002/0147923 A1 | 10/2002 | Dotan |
| 2002/0166052 A1 | 11/2002 | Garg et al. |
| 2002/0178375 A1 | 11/2002 | Whittaker et al. |
| 2002/0184520 A1 * | 12/2002 | Bush et al. | 713/200 |
| 2002/0188689 A1 | 12/2002 | Chung |
| 2002/0188869 A1 | 12/2002 | Patrick |
| 2003/0002526 A1 | 1/2003 | Dias et al. |
| 2003/0014659 A1 | 1/2003 | Zhu |
| 2003/0023445 A1 | 1/2003 | Trifon |
| 2003/0023774 A1 | 1/2003 | Gladstone et al. |
| 2003/0023880 A1 | 1/2003 | Edwards et al. |
| 2003/0025727 A1 | 2/2003 | Rath et al. |
| 2003/0037236 A1 | 2/2003 | Simon et al. |
| 2003/0037261 A1 | 2/2003 | Meffert et al. |
| 2003/0051027 A1 | 3/2003 | Aupperle et al. |
| 2003/0051142 A1 | 3/2003 | Hidalgo et al. |
| 2003/0061482 A1 | 3/2003 | Emmerichs |
| 2003/0061512 A1 | 3/2003 | Flurry et al. |
| 2003/0088807 A1 | 5/2003 | Mathiske et al. |

| | | | | | | |
|---|---|---|---|---|---|---|
| 2003/0093464 A1 | 5/2003 | Clough et al. | | 2006/0036746 A1 | 2/2006 | Davis |
| 2003/0093666 A1 | 5/2003 | Millen et al. | | 2006/0041636 A1 | 2/2006 | Ballinger et al. |
| 2003/0097591 A1 | 5/2003 | Pham et al. | | 2006/0041834 A1 | 2/2006 | Chen et al. |
| 2003/0135504 A1 | 7/2003 | Elvanoglu et al. | | 2006/0047959 A1 | 3/2006 | Morais |
| 2003/0163448 A1 | 8/2003 | Kilemba et al. | | 2006/0053048 A1 | 3/2006 | Tandetnik |
| 2003/0172293 A1 | 9/2003 | Johnson et al. | | 2006/0053224 A1 | 3/2006 | Subramaniam |
| 2003/0177226 A1 | 9/2003 | Garg et al. | | 2006/0053411 A1 | 3/2006 | Takamiya |
| 2003/0177389 A1 | 9/2003 | Albert et al. | | 2006/0056431 A1 | 3/2006 | Toyoda et al. |
| 2003/0177390 A1 | 9/2003 | Radhakrishnan | | 2006/0069613 A1 | 3/2006 | Marquardt |
| 2003/0229501 A1 | 12/2003 | Copeland et al. | | 2006/0069737 A1 | 3/2006 | Gilhuly et al. |
| 2004/0006706 A1* | 1/2004 | Erlingsson .......... 713/200 | | 2006/0123244 A1 | 6/2006 | Gheorghescu et al. |
| 2004/0025060 A1 | 2/2004 | Raffaele et al. | | 2006/0136590 A1 | 6/2006 | Barrett et al. |
| 2004/0030788 A1 | 2/2004 | Cimo et al. | | 2006/0143688 A1 | 6/2006 | Futoransky |
| 2004/0034794 A1 | 2/2004 | Mayer et al. | | 2006/0150256 A1 | 7/2006 | Fanton et al. |
| 2004/0039752 A1 | 2/2004 | Goldfuss et al. | | 2006/0155780 A1 | 7/2006 | Sakairi et al. |
| 2004/0047347 A1 | 3/2004 | Worry et al. | | 2006/0185021 A1 | 8/2006 | Dujari et al. |
| 2004/0054791 A1 | 3/2004 | Chakraborty et al. | | 2006/0259955 A1 | 11/2006 | Gunther et al. |
| 2004/0073811 A1 | 4/2004 | Sanin | | 2006/0271425 A1 | 11/2006 | Goodman et al. |
| 2004/0078577 A1 | 4/2004 | Feng et al. | | 2006/0277218 A1 | 12/2006 | Franco et al. |
| 2004/0078591 A1 | 4/2004 | Teixeira et al. | | 2006/0277592 A1 | 12/2006 | Brown et al. |
| 2004/0103200 A1 | 5/2004 | Ross et al. | | 2007/0011744 A1 | 1/2007 | Carothers et al. |
| 2004/0103203 A1 | 5/2004 | Nichols et al. | | 2007/0016949 A1 | 1/2007 | Dunagan et al. |
| 2004/0109410 A1 | 6/2004 | Chase et al. | | 2007/0016954 A1 | 1/2007 | Choi |
| 2004/0123157 A1 | 6/2004 | Alagna et al. | | 2007/0027779 A1 | 2/2007 | Bhambri et al. |
| 2004/0151323 A1 | 8/2004 | Olkin et al. | | 2007/0028185 A1 | 2/2007 | Bhogal et al. |
| 2004/0167964 A1 | 8/2004 | Rounthwaite et al. | | 2007/0050854 A1 | 3/2007 | Cooperstein et al. |
| 2004/0187031 A1 | 9/2004 | Liddle | | 2007/0073800 A1 | 3/2007 | Rothman et al. |
| 2004/0199603 A1 | 10/2004 | Tafla et al. | | 2007/0094712 A1 | 4/2007 | Gibbs et al. |
| 2004/0199763 A1 | 10/2004 | Freund | | 2007/0100915 A1 | 5/2007 | Rose |
| 2004/0205342 A1 | 10/2004 | Roegner | | 2007/0101258 A1 | 5/2007 | Xu et al. |
| 2004/0210536 A1 | 10/2004 | Gudelj et al. | | 2007/0101435 A1 | 5/2007 | Konanka et al. |
| 2004/0215731 A1 | 10/2004 | Tzann-en Szeto | | 2007/0106650 A1 | 5/2007 | Moore |
| 2004/0230825 A1 | 11/2004 | Shepherd et al. | | 2007/0107057 A1 | 5/2007 | Chander et al. |
| 2004/0239700 A1 | 12/2004 | Baschy | | 2007/0113237 A1 | 5/2007 | Hickson |
| 2004/0239703 A1 | 12/2004 | Angelica | | 2007/0113282 A1 | 5/2007 | Ross |
| 2004/0254812 A1 | 12/2004 | Horstemeyer et al. | | 2007/0124693 A1 | 5/2007 | Dominowska et al. |
| 2004/0260754 A1 | 12/2004 | Olson et al. | | 2007/0124797 A1 | 5/2007 | Gupta et al. |
| 2004/0268139 A1 | 12/2004 | Christianson et al. | | 2007/0136579 A1 | 6/2007 | Levy et al. |
| 2004/0268322 A1 | 12/2004 | Chow | | 2007/0136811 A1 | 6/2007 | Gruzman et al. |
| 2005/0015752 A1 | 1/2005 | Alpern et al. | | 2007/0146812 A1 | 6/2007 | Lawton |
| 2005/0022012 A1 | 1/2005 | Bluestone et al. | | 2007/0174419 A1 | 7/2007 | O'Connell et al. |
| 2005/0055458 A1 | 3/2005 | Mohan et al. | | 2007/0180490 A1 | 8/2007 | Renzi et al. |
| 2005/0055570 A1 | 3/2005 | Kwan et al. | | 2007/0192839 A1 | 8/2007 | Fee et al. |
| 2005/0066290 A1 | 3/2005 | Chebolu et al. | | 2007/0199000 A1 | 8/2007 | Shekhel et al. |
| 2005/0066311 A1 | 3/2005 | Hagmeier et al. | | 2007/0199050 A1 | 8/2007 | Meier |
| 2005/0071616 A1 | 3/2005 | Zimmer et al. | | 2007/0208822 A1 | 9/2007 | Wang et al. |
| 2005/0091536 A1 | 4/2005 | Whitmer et al. | | 2007/0214503 A1 | 9/2007 | Shulman et al. |
| 2005/0108518 A1 | 5/2005 | Pandya | | 2007/0260495 A1 | 11/2007 | Mace et al. |
| 2005/0108554 A1 | 5/2005 | Rubin et al. | | 2007/0261037 A1 | 11/2007 | Bendapudi |
| 2005/0114430 A1 | 5/2005 | Zheng et al. | | 2007/0271342 A1 | 11/2007 | Brandt et al. |
| 2005/0120242 A1 | 6/2005 | Mayer et al. | | 2007/0294332 A1 | 12/2007 | Karki et al. |
| 2005/0149726 A1* | 7/2005 | Joshi et al. .......... 713/164 | | 2007/0299857 A1 | 12/2007 | Gwozdz et al. |
| 2005/0154885 A1 | 7/2005 | Viscomi et al. | | 2007/0300064 A1 | 12/2007 | Isaacs et al. |
| 2005/0177635 A1 | 8/2005 | Schmidt et al. | | 2008/0005282 A1 | 1/2008 | Gaedcke |
| 2005/0182924 A1 | 8/2005 | Sauve et al. | | 2008/0010615 A1 | 1/2008 | Curtis et al. |
| 2005/0182928 A1 | 8/2005 | Kamalanathan et al. | | 2008/0046518 A1 | 2/2008 | Tonnison et al. |
| 2005/0193329 A1 | 9/2005 | Kickel | | 2008/0262913 A1 | 10/2008 | Reitz et al. |
| 2005/0198153 A1 | 9/2005 | Keohane et al. | | 2008/0313648 A1 | 12/2008 | Wang et al. |
| 2005/0204041 A1 | 9/2005 | Blinn et al. | | 2009/0037806 A1 | 2/2009 | Yang et al. |
| 2005/0216582 A1 | 9/2005 | Toomey et al. | | 2009/0043739 A1 | 2/2009 | Choi |
| 2005/0222902 A1 | 10/2005 | Coit et al. | | 2009/0070872 A1 | 3/2009 | Cowings et al. |
| 2005/0223412 A1 | 10/2005 | Nadalin et al. | | 2009/0083714 A1 | 3/2009 | Kiciman et al. |
| 2005/0223413 A1 | 10/2005 | Duggan et al. | | 2009/0132713 A1 | 5/2009 | Dutta et al. |
| 2005/0235200 A1 | 10/2005 | Goldberg | | 2009/0183171 A1 | 7/2009 | Isaacs et al. |
| 2005/0256924 A1 | 11/2005 | Chory et al. | | 2009/0183227 A1 | 7/2009 | Isaacs et al. |
| 2005/0259655 A1 | 11/2005 | Cuervo et al. | | 2009/0187918 A1 | 7/2009 | Chen et al. |
| 2005/0259674 A1 | 11/2005 | Cuervo et al. | | 2009/0254898 A1 | 10/2009 | Sareen et al. |
| 2005/0262232 A1 | 11/2005 | Cuervo et al. | | 2009/0299862 A1 | 12/2009 | Fan et al. |
| 2005/0267870 A1 | 12/2005 | Everett-Church et al. | | 2009/0300496 A1 | 12/2009 | Fan et al. |
| 2005/0268214 A1 | 12/2005 | Lu | | 2009/0327869 A1 | 12/2009 | Fan et al. |
| 2005/0283719 A1 | 12/2005 | Awamoto et al. | | 2009/0327896 A1 | 12/2009 | Pall et al. |
| 2005/0283828 A1 | 12/2005 | Perley et al. | | 2010/0058293 A1 | 3/2010 | Dunagan |
| 2006/0010134 A1 | 1/2006 | Davis | | 2011/0106948 A1 | 5/2011 | Franco |
| 2006/0015728 A1 | 1/2006 | Ballinger et al. | | | | |
| 2006/0020538 A1 | 1/2006 | Ram et al. | | | FOREIGN PATENT DOCUMENTS | |
| 2006/0020679 A1 | 1/2006 | Hinton et al. | | CN | 1366239 | 8/2002 |
| 2006/0026667 A1 | 2/2006 | Bhide et al. | | EP | 1420562 | 5/2004 |
| 2006/0031347 A1 | 2/2006 | Sahi | | HK | 1119321 | 2/2009 |
| 2006/0031404 A1 | 2/2006 | Kassab | | JP | 2001325249 | 11/2001 |

| | | |
|---|---|---|
| KR | 20070102859 | 10/2007 |
| WO | WO-0153965 | 7/2001 |
| WO | WO-0213026 | 2/2002 |
| WO | WO-0219076 | 3/2002 |
| WO | WO-0239237 | 5/2002 |
| WO | WO-03073240 | 9/2003 |
| WO | WO-2005008456 | 1/2005 |
| WO | WO-2005059755 | 6/2005 |
| WO | WO-2008002456 | 1/2008 |
| WO | WO-2008036969 | 3/2008 |

OTHER PUBLICATIONS

Enough is Enough!, retrieved from the Internet on Aug. 17, 2005: https://netfiles.uiuc.edu/ehowes/www/resource6.htm, 3 pages.

Ad Blocking Resources, retrieved from the Internet on Aug. 17, 2005: https://netfiles.uiuc.edu/ehowes/www/resource.htm, 20 pages.

SpywareGuard 2.2, retrieved from the Internet on Aug. 17, 2005: http://www.javacoolsoftward.com/spywareguard.html, 2 pages.

SpywareBlaster 3.4, retrieved from the Internet on Aug. 17, 2005: http://www.javacoolsoftware.com/spywareblaster.html, 1 page.

Intense Internet security Pro 2005, retrieved from the Internet on Aug. 17, 2005: http:/www.intenseintegrations.com/catalog/iis.php, 1 page.

Johansson, et al, "Dealing with Contextual Vulnerabilities in Code: Distinguishing between Solutions and Pseudosolutions", Elsevier Science Ltd., vol. 22, No. 2, 2003, pp. 152-159.

Zviran, et al, "Towards Generating a Data Integrity Standard", Elsevier Science, 2000, pp. 291-313.

"PCT Search Report and Written Opinion", Application No. PCT/US06/18752, (Aug. 31, 2007),7 pages.

"Final Office Action", U.S. Appl. No. 11/262,316, (Feb. 3, 2010),13 pages.

"Final Office Action", U.S. Appl. No. 11/262,316, (Apr. 17, 2009),14 pages.

"Non Final Office Action", U.S. Appl. No. 11/262,316, (Aug. 18, 2008),16 pages.

"Non-Final Office Action", U.S. Appl. No. 11/262,316, (Aug. 19, 2009),22 pages.

"Notice of Allowance", U.S. Appl. No. 11/262,316, (Jun. 28, 2010),9 pages.

Johansson, Jesper et al., "Dealing with Contextual Vulnerabilities in Code: Distinguishing between Solutions and Pseudosolutions", *Computers and security*, vol. 22, (2003),pp. 152-159.

Zviran, Moshe et al., "Towards Generating a Data Integrity Standard", *Data and Knowledge Engineering*, vol. 32, Issue 3, (Mar. 2000),pp. 291-313.

"Access Management and Single Sign-On for Web and J2EE Environments", Available at http://www.entegrity.com/products/aa/aa.shtml, (Feb. 6, 2005), 1 pages.

"Final Office Action", U.S. Appl. No. 10/606,089, (Dec. 23, 2010), 11 pages.

"Foreign Office Action", Chinese Application No. 200680031682.6, (Sep. 13, 2010), 16 pages.

"Foreign Office Action", Chinese Application No. 200680031682.6, (Jun. 19, 2009), 12 pages.

"Non Final Office Action", U.S. Appl. No. 12/146,461, (Dec. 28, 2010),13 pages.

"Wayback Machine, Security Attribute", Retrieved from <<http://web.archive.orglweb/2001_04170820_17lhttp://msdn.microsoft.comlworkshop/author/dhtmllreference/properties/security_.asp>>on Apr. 5, 2005, (Apr. 17, 2001), 3 Pages.

"About URL Security Zones", Available at http://msdn.microsoft.com/en-us/library/ms537183%28VS.85%29.aspx, (Jan. 23, 2008), 10 pages.

"Advisory Action", U.S. Appl. No. 11/426,785, Informed in an email dated Oct. 6, 2010 that this case is related., (May 26, 2010), 3 pages.

"Bindings and Profiles for the OASIS Security Assertion Markup Language (SAML)", Version 1.1, Retrieved from http://www.oasis-open.org/committees/download.php/3405/oasis-sstc-saml-bindings-1.1.pdf, Image File Wrapper was not available,(Sep. 2, 2003), 31 pages.

"Block JavaScript, VBScript, and/or Embedded Objects", *MalekTips, last accessed on Oct. 20, 2008*, available at http://malektips.com/zonealarm_pro_0008.html, (Oct. 20, 2008), 1 page.

"BPAI Decision", U.S. Appl. No. 10/606,089, (Aug. 25, 2010), 8 pages.

"CERT.org, Understanding Malicious Content Mitigation for Web Developers", Available at http://www.cert.org/tech_tips/malicious_code_mitigation.html#9.Last accessed on Nov. 22, 2010., (Feb. 2000), 9 pages.

"Content Restrictions", Version 0.9.2—Mar. 20, 2007 http://www.gerv.net/security/content-restrictions/, (Mar. 20, 2007), 3 pages.

"Enterprise Start Pages and Mashup Applications Online", Available at http://datamashups.com, (2006), 2 pages.

"eTrust Access Control", Available at http://www3.ca.com/solutions/Product/aspx?ID=154, (Jun. 8, 2001), 2 pages.

"Final Office Action", U.S. Appl. No. 10/047,302, (Mar. 28, 2007), 19 pages.

"Final Office Action", U.S. Appl. No. 11/217,748, (Jun. 8, 2009), 11 pages.

"Final Office Action", U.S. Appl. No. 11/217,748, (Aug. 4, 2010), 13 pages.

"Final Office Action", U.S. Appl. No. 11/426,174, (Nov. 24, 2008), 28 pages.

"Final Office Action", U.S. Appl. No. 11/426,174, (May 27, 2010), 25 pages.

"Final Office Action", U.S. Appl. No. 11/426,785, Informed in an email dated Oct. 6, 2010 that this case is related.,(Feb. 8, 2010), 8 pages.

"Final Office Action", U.S. Appl. No. 11/805,088, (Sep. 21, 2010), 8 pages.

"Final Office Action", U.S. Appl. No. 12/188,333, (Mar. 15, 2010), 11 pages.

"Final Office Action", U.S. Appl. No. 12/188,333, (May 21, 2009), 10 pages.

"Foreign Office Action", Chinese Application No. 200680019185.4, (Aug. 4, 2010), 13 pages.

"From Coffee to Celebrity Sightings: How Mashups are Changing Online Mapping", Spunlogic 2007, www.spunlogic.com, (2007), 6 pages.

"IBM Tivoli Federated Identity Manager", Available at http://www-01.ibm.com/software/tivoli/products/federated-identity-mgr/. (Nov. 9, 2005), 5 pages.

"International Search Report", Application No. PCT/US2008/062763, (May 6, 2008), 12 pages.

"International Search Report", Application No. PCT/US2009/045765, (May 30, 2009), 9 pages.

"Non Final Office Action", Application No. 1/217,748, (Jan. 2, 2009), 8 pages.

"Non Final Office Action", U.S. Appl. No. 10/047,302, (Apr. 11, 2005), 23 pages.

"Non Final Office Action", U.S. Appl. No. 10/047,302, (Aug. 4, 2006), 15 pages.

"Non Final Office Action", U.S. Appl. No. 11/217,748, (Nov. 24, 2009), 13 pages.

"Non Final Office Action", U.S. Appl. No. 11/426,174, (Nov. 30, 2009), 28 pages.

"Non Final Office Action", U.S. Appl. No. 11/426,174, (Mar. 18, 2008), 19 pages.

"Non Final Office Action", U.S. Appl. No. 11/426,174, (May 12, 2009), 28 pages.

"Non Final Office Action", U.S. Appl. No. 11/426,174, (Sep. 16, 2010), 26 pages.

"Non Final Office Action", U.S. Appl. No. 11/426,785, Informed in an email dated Oct. 6, 2010 that this case is related.,(Jul. 21, 2010), 13 pages.

"Non Final Office Action", U.S. Appl. No. 11/426,785, Informed in an email dated Oct. 6, 2010 that this case is related.,(Jul. 8, 2009), 10 pages.

"Non Final Office Action", U.S. Appl. No. 12/118,333, (Dec. 12, 2008), 14 pages.

"Non Final Office Action", U.S. Appl. No. 12/118,333, (Jul. 21, 2010), 9 pages.

"Non Final Office Action", U.S. Appl. No. 12/188,333, (Sep. 25, 2009), 9 pages.
"Non-Final Office Action", U.S. Appl. No. 10/606,089, (Oct. 6, 2010), 15 pages.
"Non-Final Office Action", U.S. Appl. No. 11/762,900, (Nov. 29, 2010), 13 pages.
"Non-Final Office Action", U.S. Appl. No. 11/805,088, (Jul. 21, 2010), 7 pages.
"Notice of Allowance", U.S. Appl. No. 10/047,302, (Sep. 20, 2007), 3 pages.
"Notification of Transmittal of the International Search Report and the Written Opinion of the International Searching Authority in International Application No. PCTIUS2008/087265", Application No. PCT/US2008/087265, (Jun. 25, 2009), 6 pages.
"Oasis Security Services Use Cases and Requirements", Retrieved from http://www.oasis-open.org/committees/security/docs/draft-sstc-saml-reqs-01.pdf, Cited in NFOA for U.S. Appl. No. 10/047,302,(May 30, 2001), 29 pages.
"Restriction Requirement", U.S. Appl. No. 10/047,302, (Mar. 20, 2006), 4 pages.
"Sun Java System Access Manager", Available at http://www.sun.com/software/products/access_mgr/index.xml, (Feb. 2, 2006), 3 pages.
"U.S. Appl. No. 61/058,213", (Jun. 3, 2008), 33 pages.
"U.S. Appl. No. 61/058,214", (Jun. 3, 2008), 32 pages.
"Virtual Sandbox 2.0", Retrieved from: <http://www.fortresgrand.com/products/vsb/vsb.htm>on (Jan. 25, 2008), 3 pages.
Anupam, Vinod et al., "Secure Web Scripting", *IEEE Internet Computing*, vol. 2 , Issue 6, ISSN:1089-7801, No access to the Image File Wrapper.,(Nov. 1998), 15 pages.
Barth, Adam et al., "Securing Frame Communication in Browsers", (2008), 14 pages.
Bershad, Brian N., et al., "Lighweight Remote Procedure Call", *ACM Transactions on Computer Systems*, vol. 8, No. 1, (Feb. 1990), pp. 37-55.
Bertino, Elisa et al., "On Specifying Security Policies for Web Documents with an XML-based Language", *Symposium on Access Control Models and Technologies—SACMAT*, Retrieved from http://isrl.cs.byu.edu/pubs/X-secIntro.pdf, (2001), 9 pages.
Chang, Po-Hao "An Adaptive Distributed Object Framework for the Web", Available at http://csl.cs.uiuc.edu/docs/ecoop-phd04/main.pdf, Jun. 14-15, 2004, (Jun. 14, 2004), 10 pages.
Chen, Shuo "Light-Weight Attacks Using Script Against Browser Cross-Frame Attacks Using Script Accenting", Technical Report—MSR-TR-2007-29, Mar. 14, 2007 http://ftp.research.microsoft.com/pub/tr/TR-2007-29.pdf. Last accessed Oct. 5, 2007, 16 pages.
Chen, Shuo et al., "A Systematic Approach to Uncover Security Flaws in GUI Logic", *IEEE Symposium on Security and Privacy*, May 2007, 15 pages.
Chess, et al., "JavaScript Hijacking", *Fortify Software*, (Mar. 12, 2007), 10 pages.
Couvreur, Juien "Curiosity is Bliss: Web API Authentication for Mashups", Available at http://blog.monstuff.com/_archives/000296.html, (Jun. 25, 2006), 5 pages.
De Keukelaera, Frederik et al., "SMash: Secure Component Model for Cross-Domain Mashups on Unmodified Browsers", *Proceeding of the 17th International Conference on World Wide Web*, Apr. 21-25, 2008, ACM Press, New York, NT, USA, (Apr. 21, 2008), 13 pages.
Dhamija, Rachna et al., "The Battle Against Phishing: Dynamic Security Skins", *Proceedings of the 2005 ACM Symposium on Usable Security and Privacy*, Available at <http://www.cs.berkeley.edu/~tygar/papers/Phising/Battle_against_phishing.pdf>, (Jul. 2005), pp. 77-88.
Edwards, Mark J., "The Guide to Internet Explorer Security Zones", Retrieved from http://www.windowsitpro.com/article/internet/the-quide-to-internet-explorer-security-zones.aspx on Dec. 7, 2010, (Jan. 2000), 3 pages.
Erlingsson, Ulfar et al., "End-to-End Web Application Security", Available at http://www.usenix.orq/events/hotos07/tech/_fulLpapers/erlingsson/erlingsson_html/, (Apr. 2007), 6 pages.
Evans, David E., "Policy-Directed Code Safety", Available at http://www.cs.virginia/edu/-evans/phd-thesis/thesis.ps.qz, (Feb. 2000), 137 pages.

Fettig, Abe "How to Make XMLHttpRequest Calls to Another Server in Your Domain", http://ajaxian.com/archives/how-to-make-xmlhttprequest-calls-to-another-server-in-your-domain. Last accessed Oct. 28, 2010, (Nov. 29, 2005), 2 pages.
Gong, Li et al., "Going Beyond the Sandbox: An Overview of the New Security Architecture in the Java Development Kit 1.2", *Proceedings of the USENIX Symposium on Intervet Technologies and Systems*, Monterey, CA, (Dec. 1997), 10 pages.
Hallam-Baker, Phillip "X-TASS: XML Trust Assertion Service Specification", *VeriSign, Version 0.9*, Retrieved from http://www.oasis-open.org/committees/security/docs/draft-xtass-v09.pdf, (Jan. 5, 2001), 26 pages.
Howell, Jon et al., "MashupOS: Operating System Abstractions for Client Mashups", *Proceedings 11th USENIX workshop on Hot Topics in Operating Systems*, (2007), 7 pages.
Ieblog, "Using Frames More Securely", Available at http://blogs.msdn.com/ie/archive/2008/01/18/using-frames-more-securely.aspx, (Jan. 18, 2008), 19 pages.
Jackson, Collin et al., "Subspace: Secure Cross-Domain Communication for Web Mashups", *WWW 2007*, May 8-12, 2007, Banff, Alberta, Canada ACM 978-1-59593-654-7/07/0005 http://www.collinjackson.com/research/papers/fp801-jackson.pdf, (May 8, 2007), 10 pages.
Jim, Trevor et al., "Defeating Script Injection Attacks with Browser-Enforced Embedded Policies", *In Proceedings of WWW 2007*, (May 2007), pp. 601-610.
Jose, Rui et al., "Integrated Context Management for Multi-domain Pervasive Environments", *MCMP-05*, Available at <https://repositorium.sdum.uminho.pt/bitstream/1822/2878/1/2005-MCMP-vade-context_final.pdf>, (May 2005), 10 pages.
Kals, Stefan et al., "SecuBat: A Web Vulnerability Scanner", *WWW 2006*, Available at <http://www.seclab.tuwien.ac.at/papers/secubat.pdf>,(May 2006), 10 pages.
Karger, David R., et al., "Haystack: A User Interface for Creating, Browsing, and Organizing Arbitrary Semistructured Information", *CHI 2004 Demonstration*, Apr. 24-29, 2004, Vienna, Austria, ACM 1-58113-703-6/04/0004,(Apr. 24, 2004), pp. 777-778.
McLaren, Chris et al., "Oasis SSTC SAML Protocols Schema Discussion", Retrieved from http://www.oasis-open.org/committees/security/docs/draft-sstc-protocol-discussion-01.pdf, Cited in NFOA for U.S. Appl. No. 10/047,302,(Jul. 28, 2001), 14 pages.
Miller, Mark S., et al., "Caja: Safe Active Content in Sanitized JavaScript", *Draft Tech Report*. Available at google-caja.googlecode.com/files/caja-spec-2008-01-15.pdf, (Nov. 5, 2007), 26 pages.
Muffincharizard, "Having Download Problems (About Mobile Code)", Available at http://forums.zonelabs.com/showthread.php?t=39390, (Sep. 16, 2003), 2 pages.
Murphy, Jim et al., "Securing the Enterprise from Malware Threats", Available at http://www.surfcontrol.com/uploadedfiles/general/white_papers/Malware_Whitepaper.pdf, (2004), 14 pages.
Ollmann, "HTML Code Injection and Cross-Site Scripting", http://www.techincalinfo.net/papers/CSS.html, accessed Jan. 18, 2006,(Jan. 2003), 20 pages.
Reis, Charles et al., "Architectural Principles for Safe Web Programs", *Department of Computer Science and Engineering, University of Washington*, (2007), 7 pages.
Reis, Charles et al., "Browsershield: Vulnerability-Driven Filtering of Dynamic HTML", vol. 1, Issue 3, ACM Press New York, NY, USA, (Sep. 2007), 14 pages.
Scott, David et al., "Abstracting Application-Level Web Security", *In Proceedings of WWW 2002*, (May 2002), 13 pages.
Scott, et al., "Design Considerations for Cross Page Post Backs in ASP.NET 2.0", http://odetocode.com/Articles/421.aspx, (Jul. 24, 2005), 9 pages.
Selkirk, A. "Using XML Security Mechanisms", *BT Technology Journal*, vol. 19, No. 3, DOI: 10.1023/A:1011930030096, (Jul. 2001), pp. 35-43.
Selkirk, A. "XML and Security", *BT Technology Journal*, vol. 19, No. 23-34 DOI: 10:1023/A:1011977913258, (Jul. 2001), pp. 23-34.
Sliwa, Carol "Microsoft Bolsters Internet Explorer Security", *Network World Fusion*, Retrieved from www.nwfusion.com/archive/1997/97-06-09micr-a.html on Nov. 22, 2010.,(Jun. 9, 1997), 2 pages.

Snell, Ned "SAMS Teach Yourself the Internet in 24 Hours", *Third Edition, ISBN: 0-672-31589-0*, Available at http://my.safaribooksonline.com/web-applications-and-services/0672315890, (Jun. 17, 1999), 528 pages.

Thorpe, Danny "Secure Cross-Domain Communication in the Browser", Available http://msdn.microsoft.com/en-us/library/bb735305(printer).aspx, (2008), 6 pages.

Vuong, Nathan N., et al., "Managing Security Policies in a Distributed Environment Using eXtensible Markup Language (XML)", *ACM Symposium on Applied Computing-SAC*, Retrieved from http://users.cis.fiu.edu/~smithg/papers/sac01.pdf, (2001), 7 pages.

Wahbe, Robert et al., "Efficient Software-Based Fault Isolation", 1993 ACM SIGOPS, Dec. 5-8, 1993, (Dec. 5, 1993), 14 pages.

Wang, Helen J., et al., "Protection and Communication Abstractions for Web Browsers in MashupOS", *SOSP07, ACM*, Oct. 14-17, 2007, (Oct. 14, 2007), 15 pages.

Wang, Helen J., et al., "Shield: Vulnerability-Driven Network Filters for Preventing Known Vulnerability Expolits", SIGCOMM '04, Aug. 30-Sep. 3, 2004, Portland, OR, Available at http://dalivery.acm.org/10.1145/1_020000/1_015489/p193-wang.pdf?key1=1015489&key2=8156443411_&coll=GUIDE&dl=GUIDE&CFID=72316072&CFTOKEN=46175408, (Aug. 30, 2004), pp. 193-204.

Wang, Helen J., et al., "The Multi-Principal OS Construction of the Gazelle Web Browser", *Microsoft Research, White Paper*, (Feb. 2009), 16 pages.

Wheeler, David "Secure Programming for Linux and Unix Howto", version 2.966,(2002), 1-143.

Yoshihama, Sachiko et al., "Security Model for the Client-Side Web Application Environments", *IBM Tokyo Research Laboratory*, (May 24, 2007), 2 pages.

Zhang, Yan et al., "An Agent-Based Framework for Cross-Domain Cooperation of Enterprise", *Computer Supported Cooperative Work in Design, 2004*. http://ieeexplore.ieee.org/xpl/abs_free.jsp?arNumber=1349034, printed on Apr. 13, 2006, (May 26, 2004), 1 page.

"CERT Advisory CA-2000-02 Malicious HTML Tags Embedded in Client Web Requests", *Carnegie Mellon University*, http://www.cert.org/advisories/CA-2000-02.html., (Feb. 2, 2000),7 pages.

"Examiner's Answer to an Appeal", U.S. Appl. No. 10/606,089, (Apr. 8, 2008),18 pages.

"Final Office Action", U.S. Appl. No. 10/606,089, (May 29, 2007),12 pages.

"Final Office Action", U.S. Appl. No. 10/606,089, (Jul. 24, 2006),12 pages.

"Non Final Office Action", U.S. Appl. No. 10/606,089, (Jan. 4, 2007),15 pages.

"Non Final Office Action", U.S. Appl. No. 10/606,089, (Feb. 15, 2006),11 pages.

"Non-Final Office Action", U.S. Appl. No. 10/606,089, (Feb. 17, 2011),20 pages.

Jajodia, Sushil et al., "A Unified Framework for Enforcing Multiple Access Control Policies", *In Proceedings of the 1997 ACM SIGMOD International Conference on Management of Data* (Tucson, AZ, USA)., (1997),12 pages.

Sirer, Emin G., et al., "An Access Control Language for Web Services", *In Proceedings of the 11th International Conference on World Wide Web* (Honolulu, HI, USA, May 7-11, 2002). WWW '02. ACM Press, New York, NY, 396-407. DOI=http://doi.acm.org/1, (May 7, 2002),8 pages.

"Appeal Decision", U.S. Appl. No. 12/118,333, (Jun. 8, 2011), 2 pages.

"Final Office Action", U.S. Appl. No. 10/606,089, (Jul. 15, 2011), 17 pages.

"Final Office Action", U.S. Appl. No. 11/426,174, (Mar. 17, 2011), 28 pages.

"Final Office Action", U.S. Appl. No. 11/426,785, (Feb. 3, 2011), 13 pages.

"Final Office Action", U.S. Appl. No. 12/118,333, (Jan. 14, 2011), 17 pages.

"Internet-based Content Security Protection in the Net", *Internet Citation*, 2004, retrieved from <http://www.streamshield.com/resources/whitepapers.php> on Dec. 20, 2005, (2004), 19 pages.

"Non Final Office Action", U.S. Appl. No. 11/183,329, (May 19, 2011), 15 pages.

"Non Final Office Action", U.S. Appl. No. 11/217,748, (Feb. 14, 2011), 13 pages.

"Non Final Office Action", U.S. Appl. No. 11/426,785, (Jun. 27, 2011), 21 pages.

"Non Final Office Action", U.S. Appl. No. 12/016,654, (May 12, 2011), 18 pages.

"Non Final Office Action", U.S. Appl. No. 12/146,460, (Jun. 6, 2011), 14 pages.

"Non Final Office Action", U.S. Appl. No. 12/147,620, (Feb. 7, 2011), 14 pages.

"Non Final Office Action", U.S. Appl. No. 12/147,963, (Jun. 15, 2011), 10 pages.

"Performing Code Assist on Java Code", *JDT Plug-in Developer Guide. Programmer's Guide. JDT Core.*, retrieved from <http://help.eclipse.org/helios/topic/org.eclipse.jdt.doc.isv/guide/jdt_api_codeassist.htm>on Apr. 27, 2011, 3 pages.

U.S. Appl. No. 61/020,597, (Jan. 11, 2008), 61 pages.

U.S. Appl. No. 61/058,213, (Jun. 3, 2008), 36 pages.

U.S. Appl. No. 61/058,214, (Jun. 3, 2008), 35 pages.

"U. S. Appl. No. 61/020,597", (Jan. 11, 2008), 61 pages.

"Veritas OpForce", retrieved from <http://www.symantec.qassociates.co.uk/server-provisioning-veritas-opforce.htm> on Jan. 3, 2008, 3 pages.

Alsop, Phil "Symantec: Breaking through the Dissimilar Hardware Restore Challenge", *Storage Networking Solutions (SNSEurope*, retreived from <http://www.snseurope.com/snslink/news/printer-friendly.php?newsid=4635> on Jan. 3, 2008, (Sep. 19, 2006), 4 pages.

Epstein, Kevin "Scalent Systems—Next Generation Data Center Virtualization", retrieved from <http://scalent.findtechblogs.com/?q=afcom> on Jan. 3, 2008,(Apr. 24, 2007), 1 page.

Martin, Jr., David M., et al., "Blocking Java Applets at the Firewall", *Proceedings of the Network and Distributed System Security Symposium, San Diego, CA*, Feb. 10-11, 1997, IEEE Computer Soc., (Feb. 10, 1997), 11 pages.

Raggett, Dave "HTML 4.01", *W3C*, retrieved from <http://www.w3.org/TR/html401/present/frames.html> on May 30, 2011,(Dec. 24, 1999), 14 pages.

"Final Office Action", U.S. Appl. No. 12/147,620, (Jul. 25, 2011), 15 pages.

Scott, David "Specifying and Enforcing Application-Level Web Security Policies", IEEE Transactions on Knowledge and Data Engineering, vol. 15, No. 4, (Jul. 2003), pp. 771-783.

Scott, David et al., "Developing Secure Web Applications", IEEE Internet Computing, vol. 6, No. 6, (Nov. 2002), pp. 38-45.

\* cited by examiner

RUNNING INTERNET APPLICATIONS WITH LOW RIGHTS

TECHNICAL FIELD

This invention pertains to running internet applications with low rights.

BACKGROUND

Many different types of applications are able to interact with the Internet and acquire data or other information from the Internet. For example, some applications can allow a user to download certain content, such as web pages, files and the like. With the ability to interact with the Internet come various risks that are associated with such interaction.

For example, through various interactions that can take place between an application and the Internet, so called malware or spyware can get downloaded on the user's system and can adversely impact the system's performance and, perhaps more importantly, can impermissibly install malicious software. For example, buffer overruns and other security holes can allow malware to maliciously make its way onto a user's system.

With regard to impacting the system's performance, consider the following. In some instances, malware may attempt to, or may actually change security settings associated with a particular application or the user's system in general, thus rendering it more likely for malicious tampering to take place.

Against the backdrop of these and other security concerns remains the ever-present desire, on the part of those who develop software, to provide the user with a safe and rich experience.

SUMMARY

In various embodiments, applications that are configured to interact with the Internet, in some way, are executed in a restricted process with a reduced privilege level that can prohibit the application from accessing portions of an associated computing device. For example, in some embodiments, the restricted process can prohibit applications from read and write access to portions of a system's computer-readable media, such as the hard disk, that contains administrative data and settings information and user data and settings. In these embodiments, a special portion of the disk, termed a "containment zone", is designated and used by applications in this restricted process.

In other embodiments, a broker mechanism is utilized and is logically interposed between the application and restricted portions or containment zones of the computing system. The broker mechanism acts to broker access to these restricted portions and to ensure that the user is aware of and can approve the application's access to these restricted portions of the computing system.

In other embodiments, a shim mechanism is employed to redirect access, typically for third party extensions, to the containment zones.

In yet other embodiments, an application's execution in the restricted process can result in another application being launched which is functionally similar to the restricted application, yet is less restricted in order to facilitate the user experience in particular contexts which have been deemed as trusted or at least desirably secure.

DETAILED DESCRIPTION

Overview

In the embodiments described below, applications that are configured to interact with the Internet in some way are executed in a restricted process with a reduced privilege level that can prohibit the application from accessing portions of an associated computing device. For example, in some embodiments, the restricted process can prohibit applications from read and write access to portions of a system's computer-readable media, such as the hard disk, that contains administrative data and settings information and user data and settings. In these embodiments, a special portion of the disk, termed a "containment zone", is designated and used by applications in this restricted process.

In other embodiments, a broker mechanism is utilized and is logically interposed between the application and restricted portions or containment zones of the computing system. The broker mechanism acts to broker access to these restricted portions and to ensure that the user is aware of and can approve the application's access to these restricted portions of the computing system.

In other embodiments, a shim mechanism is employed to redirect access, typically for third party extensions, to the containment zones.

In yet other embodiments, an application's execution in the restricted process can result in another application being launched which is functionally similar to the restricted application, yet is less restricted in order to facilitate the user experience in particular contexts which have been deemed as trusted or at least desirably secure.

The techniques described in this document can be employed in connection with any type of application that interacts with the Internet. These types of applications, as will be appreciated by the skilled artisan, are many and varied. However, to provide a tangible context to appreciate the inventive embodiments, an application in the form of a web browser application is utilized. It is to be appreciated and understood, however, that the techniques can be employed with other types of applications without departing from the spirit and scope of the claimed subject matter. By way of example and not limitation, these other types of applications include instant messaging clients, peer-to-peer clients, RSS readers, email clients, word processing clients and the like.

Restricting Internet Applications and Using a Broker

Figure 1:
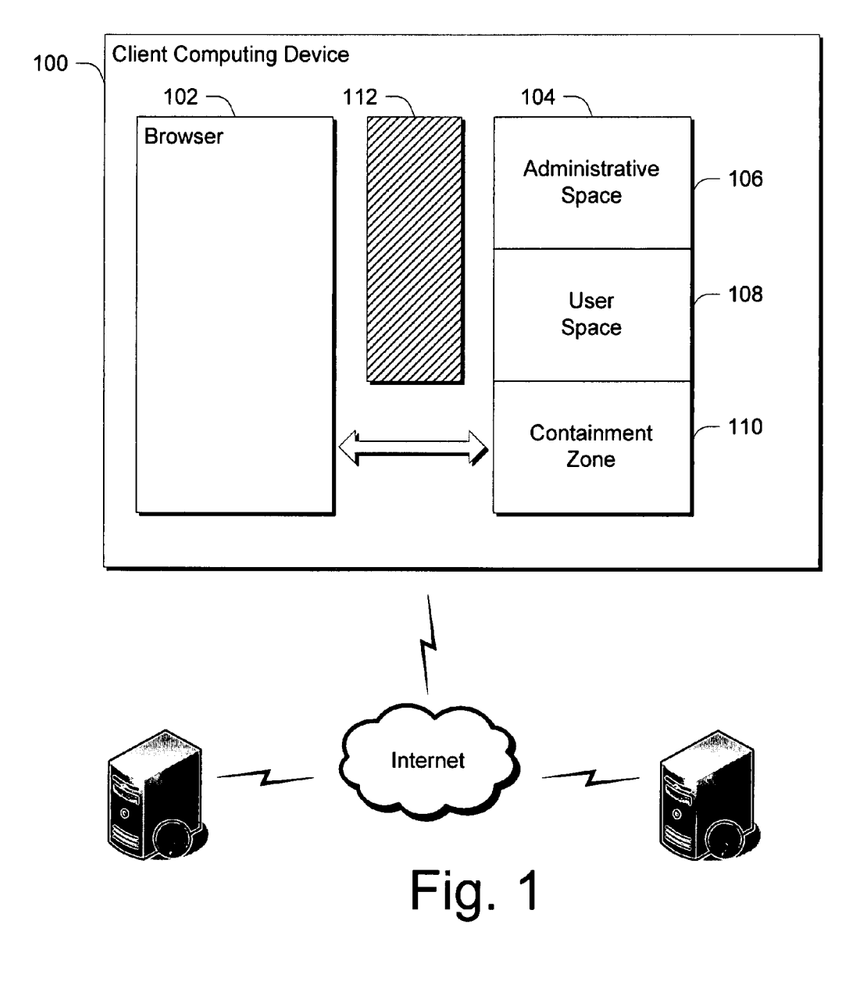
FIG. 1 is a block diagram of a system in accordance with one embodiment.

FIG. 1 illustrates a high level view of a system 100 in accordance with one embodiment. In this example, system 100 includes an Internet application in the form of a web browser 102 that can interact with the Internet as shown. System 100 also includes computer-readable media 104, such as a hard disk, that contains different portions or "space" that contain different types of information, settings data and the like.

In this example, one portion or space is the administrative space 106 that includes information and data that is usually accessible to and manipulable by a system administrator. This type of information and data can include information and data that is typically contained in operating system folders, computer system folders, permanent file folders and the like. This space usually requires an administrator with the appropriate credentials and privileges in order for its content to be accessed and manipulated.

Another portion or space is the user space 108 that includes user information and data. This type of information and data can include information and data that is typically contained in user-accessible folders such as My Documents, My Music, Desktop and the like. This space can typically be associated with lesser privileges in order for access to be granted.

In accordance with one embodiment, computer-readable media 104 includes one or more containment zones 110. A containment zone is the only zone which can, in at least some embodiments, be directly written to by browser 102. To facilitate this functionality, a wall or blocking mechanism 112 is provided and prevents browser 102 from directly writing to the administrative space 106 or the user space. In at least some embodiments, a containment zone can allow for the settings of the restricted application to be saved between sessions in a place where they could not pollute any other application on the machine. The containment zone might include a few registry locations and files folders. In the context of a web browser application, containment zone 110 can include a Temporary Internet Files folder which is used to improve web page loading time and for caching other types of data.

Thus, in this embodiment, one or more containment zones are specifically defined and designated as those portions of the computing device to which an Internet application, such as a web browser application, can have access. This is different from an approach which simply denies access to portions of a disk and permits access to other portions based on the particular user who might be attempting such access. Rather, in the inventive type of approach, the restriction is application-centric and not necessarily user-centric. That is, the inventive approach can be considered as user-independent. This approach helps to ensure that only a small number, e.g. a minimum number of required locations, are exposed in the containment zone and helps to ensure that other applications do not store settings in the containment zone. In addition, this application-centric approach can make both the administrative and the user space inaccessible to the application.

Hence, at this point, wall or blocking mechanism 112 is logically interposed between browser 102 and certain pre-defined spaces, such as the administrative and user spaces, to prevent the browser from directly accessing such spaces. Yet, in some instances, it can be desirable to allow an application to access the administrative or user space. For example, the user who is a system administrator may wish to legitimately manipulate some system settings. Alternately, a regular user may wish to save a picture to the My Document folder.

In this embodiment, a broker mechanism is utilized and is logically interposed between the application, in this case browser 102, and restricted portions or containment zones of the computing system. The broker mechanism acts to broker access to these restricted portions and to ensure that the user is aware of and can approve the application's access to these restricted portions of the computing system.

Figure 2:
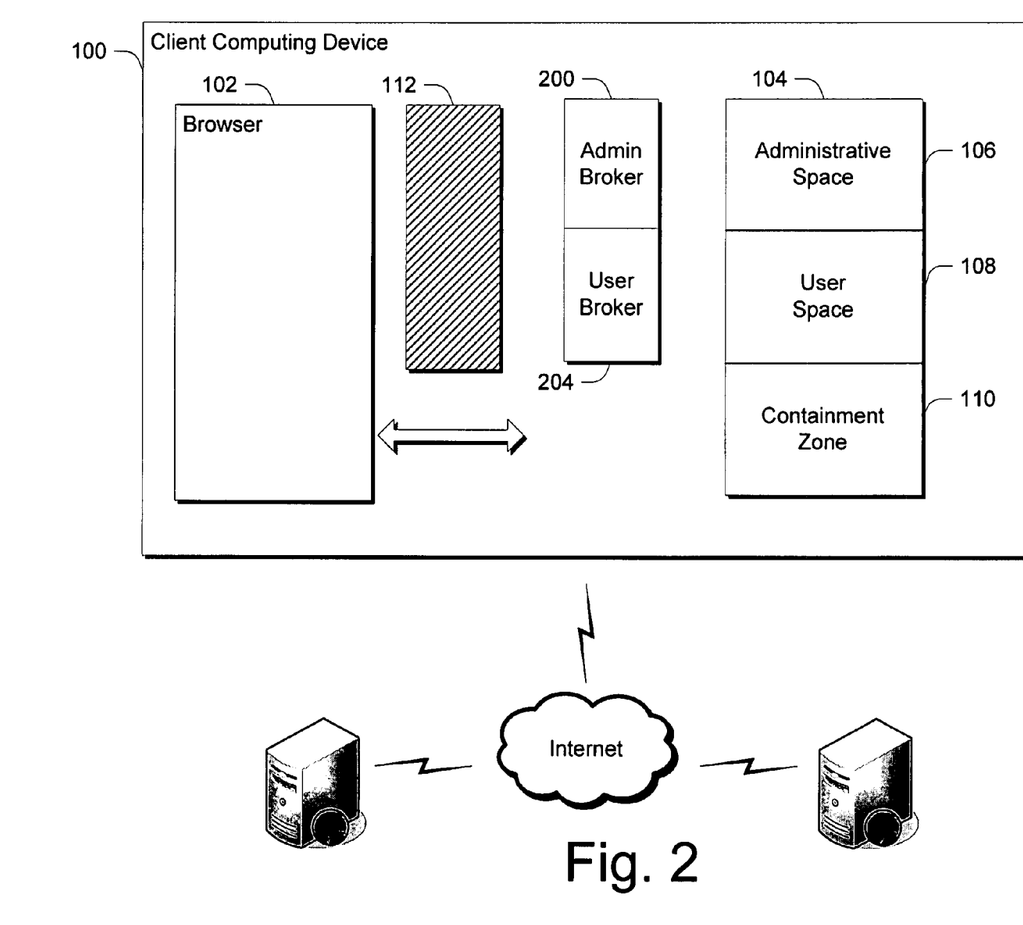
FIG. 2 is a block diagram of a system in accordance with one embodiment.

As an example, consider FIG. 2, wherein like numerals from the FIG. 1 embodiment have been utilized. There, a broker mechanism is provided in the form of broker objects 200, 202. In this example, broker object 200 is an administrative space broker object and brokers access to the administrative space 106. Broker object 202, on the other hand, is a user space broker object and brokers access to the user space.

The broker mechanism can be implemented in any suitable way using any suitable type of object. In one implementation, each broker object is implemented as a DCOM local server object. In addition, broker objects run in a separate process from browser 102, which provides a degree of protection from attacks by malicious code that target browser 102. In addition, in at least one implementation, the broker objects are task based and have their lifetimes defined by the tasks that they are to accomplish.

In this example, when an application such as browser 102 wishes to access a particular restricted space, such as the administrative or user space, the application calls the associated broker object which then inspects the application's request. The broker object can inspect the request for a number of reasons among which include ensuring that it is a well-formed request or checking for an electronic signature on the files being downloaded by the application. Once the request is inspected, the broker object can take steps to broker access to the restricted space.

In some embodiments, this can include prompting the user to ascertain whether the user wishes to access the space in the manner represented in the request. For example, if the user is attempting to save a picture to their My Documents folder, the broker object may simply ask the user, through an appropriate dialog box, if this is the user's intent. If confirmed, then the broker object can permit and facilitate the access. Alternately or additionally, if the user is the administrator and is attempting to write to the administrative space, then the broker object may request the administrator to enter their credentials. In this manner, access to the restricted space is maintained. In these examples, the broker objects perform the writing or modify the restricted space so as to abstract that process away from the application that is calling.

Thus, wall or blocking mechanism 112 and the broker mechanism 200, 202 collectively work to block access to restricted portions of the disk, yet not inhibit access to those portions in appropriate circumstances.

Having explored the notion of the wall or blocking mechanism, as well as the broker mechanism, the discussion that follows just below provides but one example (along with an alternative example) of how the blocking mechanism can be implemented. It is to be appreciated and understood that the blocking mechanism and broker mechanism can be implemented in other ways without departing from the spirit and scope of the claimed subject matter.

Blocking Mechanism—Implementation Example

In the discussion that follows, a blocking mechanism is described in the context of a tokenized system that imposes low rights on an Internet application. The imposition of low rights, in turn, causes certain portions of the client system, such as the administrative and user spaces, to be restricted from the application. In a first embodiment, a token which is not necessarily structured to inherently permit this type of applicant-centric functionality is processed and reconfigured to implement this functionality. In a second embodiment, a token is structured, through what are referred to as "integrity levels", to permit the application-centric functionality described above.

First Embodiment—Reconfiguring a Token

In many systems, when a user runs or executes an application, the application executes in the user's context. What this means is that the user typically has user data, such as a user name and user privileges, that circumscribe the execution of the application. More specifically, the user name and privileges can be represented by and in the context of a token. Thus, when a user executes an application, the application becomes aware of and inherits aspects of the user's context, such as the user's privileges, via the token. Accordingly, if the user is the system administrator, then an associated token would identify the user as such, and the application would inherit the system administrator's privileges which, in turn, would allow the application to write to the administrative space mentioned above.

Figure 3:
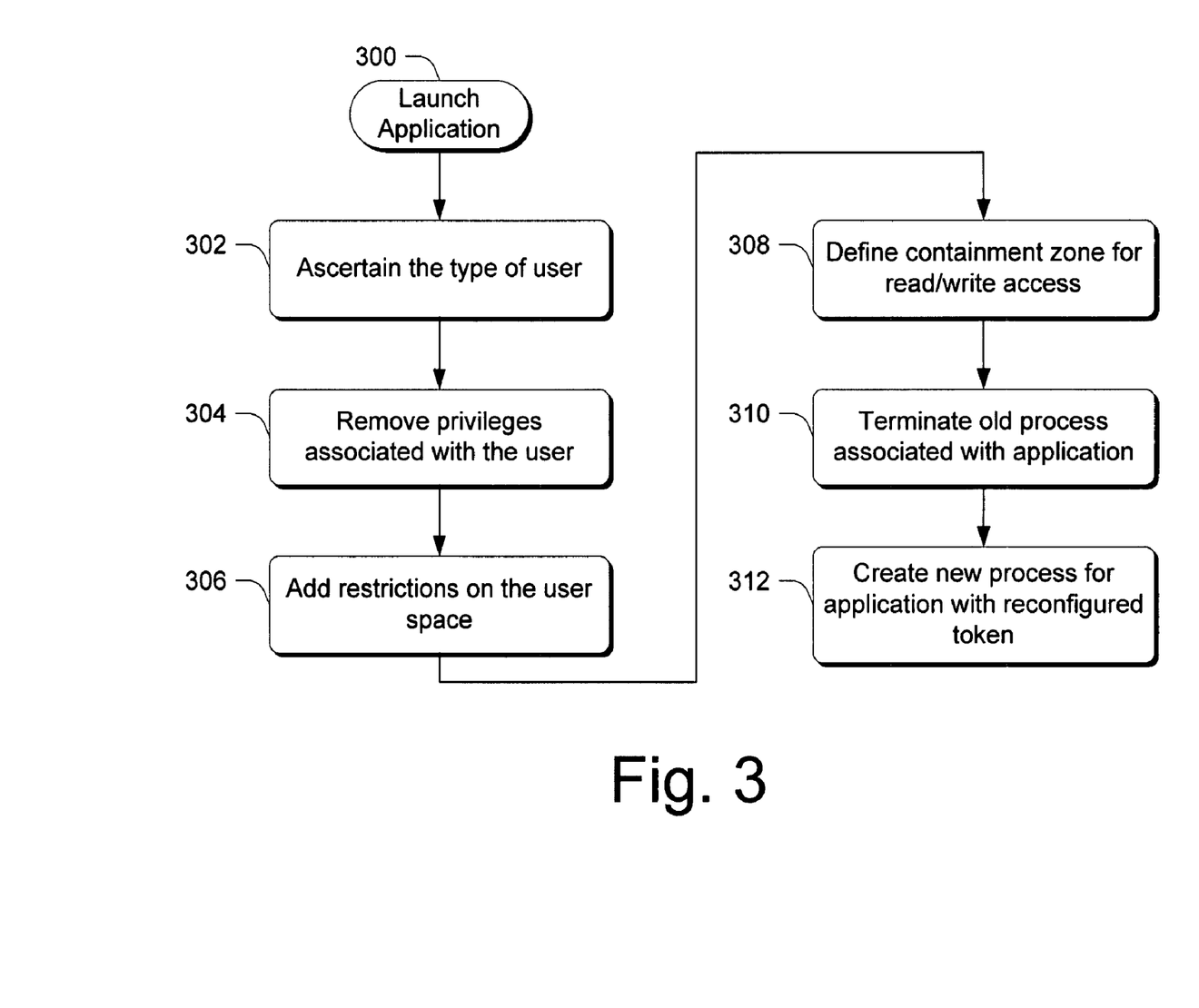
FIG. 3 is a flow diagram that describes steps in a method in accordance with one embodiment.

FIG. 3 is a flow diagram that describes steps in a token processing method in accordance with one embodiment. The method can be implemented in connection with any suitable hardware, software, firmware or combination thereof. In one embodiment, aspects of the method are implemented by a suitably configured application, such as browser application 102 in FIGS. 1 and 2.

Step 300 launches an application which, in the present example, is a web browser such as the browser illustrated and described above. When the user launches the application, a token associated with the user becomes available to the application from which, as noted above, the application can inherit the user's privileges.

Step 302 ascertains the type of user. There can be different types of users such as an administrative user, a power user, a backup operator and the like. Step 304 removes privileges associated with the type of user. In the illustrated embodiment, this step is implemented by effectively manipulating the token's data to remove designations that indicate any privileges associated with the token and hence, the user type. This step essentially creates a block to the administrative space of the computing device, such as administrative space 106 in FIGS. 1 and 2.

Step 306 adds restrictions on the user space. In the illustrated and described embodiment, this is done by effectively manipulating the token's data to remove the user's name from the token. By removing the user's name from the token, the privileges that are associated with that particular user are removed as well.

Step 308 then defines one or more containment zones for read/write access. In this particular example, this step is implemented by replacing the removed user name with a particular defined user group name, for example, "IEUsersGroup". Now, for the one or more containment zones, these zones are the only zones designated for read/write access for members of the particular defined group name.

Thus, at this point, any administrative privileges have been removed thus effectively blocking the administrative space. Likewise, the user's privileges have been removed, thus blocking access to the user space. However, by changing the user's name to a particular group name and associating that group name with the containment zone(s), read/write access for the application can now be limited only to the containment zone(s).

More specifically, having proceeded as described above, step 310 terminates the old process associated with the application that was launched, and step 312 creates a new process for the application with the reconfigured token.

Using this reconfigured token, the application will not be able to directly access either the administrative space or the user space. Rather, the application will only be able to directly write to the containment zone and, without further intervention by, for example, a broker mechanism, the application will be unable to cause data to be written to the user or administrative space.

Second Embodiment—Using Integrity Levels

In another embodiment, a token is utilized and is structured, through what are referred to as "integrity levels", to permit the application-centric functionality described above. That is, through a process referred to as Mandatory Integrity Control, the token that is associated with a user has different integrity levels such as "high", "medium" and "low" that can be set. Likewise, computing resources on the client device have associated integrity levels and in order to access resources, the resource must have the same integrity level or one that is lower than the user's integrity level.

So, for example, by establishing the integrity levels of the administrative and user spaces as "high" and "medium" respectively, and that of the user as "low", access to the administrative and user spaces is effectively blocked. However, designating a containment zone as having a "low" level of integrity allows a user to access that containment zone through whatever application the user happens to be using.

Using a Shim

Figure 4:
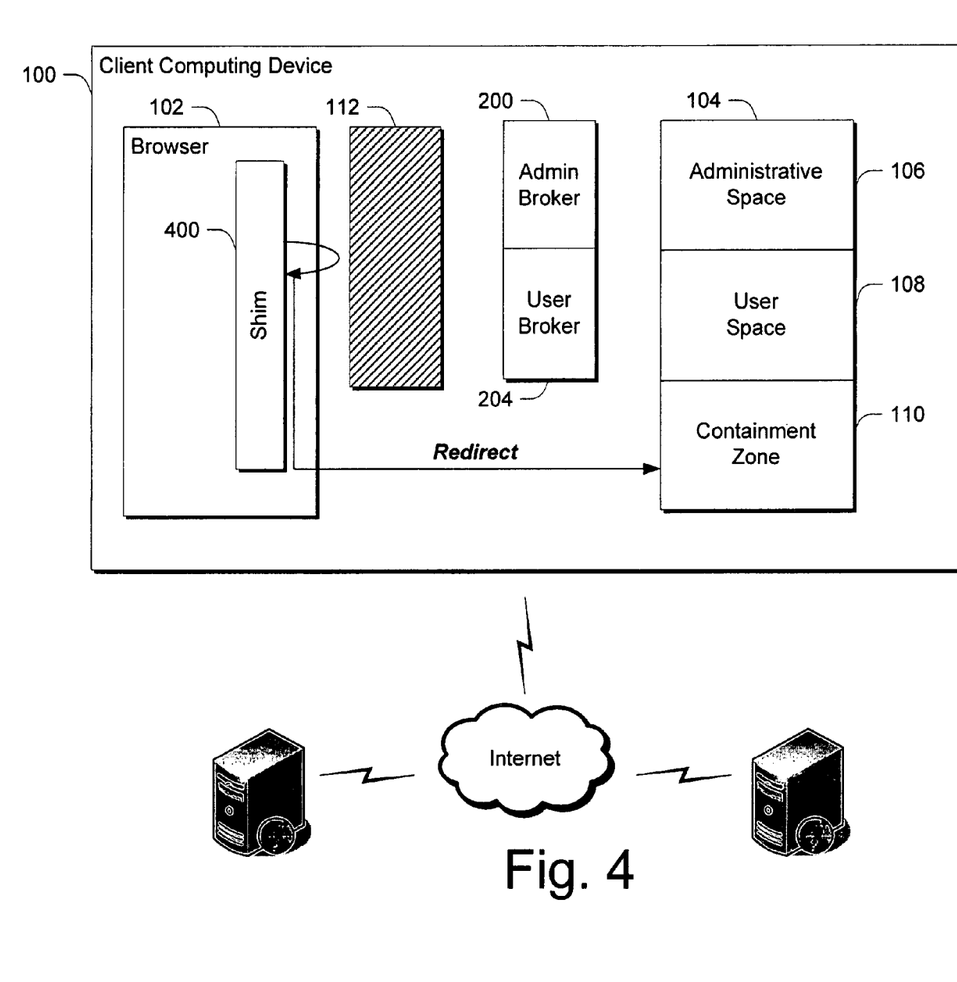
FIG. 4 is a block diagram of a system in accordance with one embodiment.

In at least some embodiments, a shim mechanism, such as shim 400 in FIG. 4, is utilized to redirect access, typically for third party extensions, to the containment zones. More specifically, in the context of the browser application, many different third party extensions can be provided and run in conjunction with or inside of the browser. For example, the Google toolbar is one example of an extension that is designed to run inside of a browser.

Certain extensions typically require write access to sections of a file system and/or registry in order to operate correctly. For example, the Google tool bar may wish to save a list of favorite searches for a particular user. Yet, without access to the user space, this type of write would be blocked by the wall or blocking mechanism 112.

In accordance with one embodiment, when application 102 or an associated third party component attempts to write to a restricted space, shim 400 is configured to trap and redirect the call and write the data into a containment zone. Subsequent calls by the application for the data that was redirected to the containment zone are handled by the shim and the appropriate data is retrieved from the containment zone. Hence, data that was intended to be written to the administrative or user space by a particular extension or application is redirected into an appropriate containment zone.

This allows third party extensions to continue to operate without requiring any third party code to be rewritten. In operation, the third party extension believes it is writing data to the user or administrative space. Yet, through the mechanism of the shim, such data is getting written to and read from the containment zone.

Launching an Application that is Not Restricted

As noted above, in some embodiments, an application's execution in the restricted process can result in another application being launched which is functionally similar to the restricted application, yet is less restricted in order to facilitate the user experience in particular contexts which have been deemed as trusted or at least desirably secure.

As a more tangible example, consider the following in the browser context. Assume that a corporate user has access through their client computing device to both the Internet and a company intranet. Assume also that the company intranet is a secure and trusted entity. Further assume that the user's computing device is executing several different business applications that need a high degree of compatibility to keep running properly. In context such as these, as well as others, it can be desirable to allow the application to operate in an unrestricted manner when executing in the context of the company's intranet—that is, in a manner that is unrestricted by blocking mechanism 112.

Figure 5:
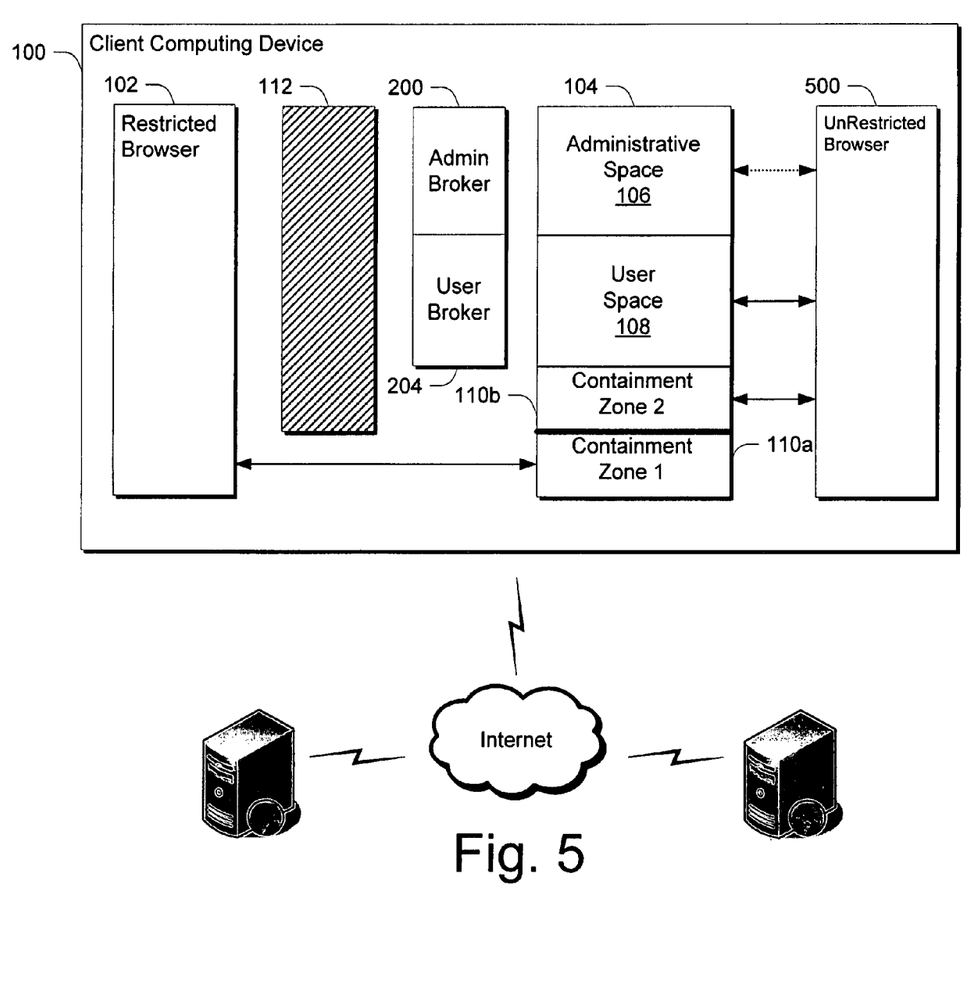
FIG. 5 is a block diagram of a system in accordance with one embodiment.

As an example, consider FIG. 5 in connection with the following. There are certain contexts that an application may attempt to execute in, and these contexts can pertain to a particular zone that has been defined as being trusted or may otherwise carry with it a level of security that has been defined as "safe". In the browser example, the user may attempt to navigate to a corporate intranet or some other safe zone. In this case, restricted browser 102 calls the broker mechanism and the broker mechanism, based on the call that the application is making, can instantiate an unrestricted browser 500 with which the user can operate in the particular zone to which they have navigated. In this example, a token is created and configured to include the privileges associated with the user (such as administrative privileges, power user privileges and the like), as well as a user name associated with the user to provide the user with access to the appropriate portion of the user space.

In addition, in this embodiment, the containment zone is defined in a manner that maintains a separation between the restricted and unrestricted browsers 102, 500 respectively. Specifically, recall from the discussion above that a containment zone in the form of a Temporary Internet File folder is provided into which the restricted browser 102 and other components read and write. Yet, in the present embodiment, if the unrestricted browser 500 were to use this containment zone for writing temporary Internet files, there is a chance that the restricted browser could access this data or otherwise use this containment zone overlap to attempt to maliciously gain access to portions of the computing device to which it should not have access.

Accordingly, to address this situation, as well as others, different containment zones are defined, one of which being associated with the restricted browser 102, the other of which being associated with the unrestricted browser 500 and isolated from the restricted browser. In the illustrated example, containment zone 110a is associated with and useable only by restricted browser 102. Likewise, containment zone 110b is associated with and useable only by unrestricted browser 500. Neither browser can read or write to or from the other's associated containment zone. As such, wall 112 is seen to extend down and block access from the restricted browser 102 to containment zone 110b.

In the implementation above in which the token is processed and reconfigured, containment zone 110a is designated as being able to be read from and written to only by the group identified in the token. Hence, applications executing in the context of this token cannot access containment zone 110b.

Exemplary Use Scenarios

The following use scenarios provide some additional examples of how the above-described inventive embodiments can be utilized in the context of a web browser.

Consider first an example in which the inventive embodiments can be utilized to protect the user. Assume that user Abby visits a website that exploits a buffer overrun in the browser to install a control. Here, Abby navigates to a page that uses a buffer overrun exploit in the browser to inject native code into the process space. The native code downloads a dynamic link library (DLL) into a folder on her machine and attempts to register as an ActiveX control to be loaded by the browser by creating entries in the registry. Here, however, the operation fails because the browser does not have permission to write to the registry. Abby then receives a notification and continues to browse securely.

As another example, assume that user Abby visits a website that uses a control she has installed to attempt to overwrite a system file. Here, Abby navigates to a page that contains an already installed ActiveX control. The control attempts to overwrite a DLL in her system folder. Here, however, the operation is rejected and Abby receives a notification informing her that the page attempted to perform a privileged operation. She then continues to browse securely.

Consider now an example in which the inventive embodiments can be utilized to maintain the compatibility of Abby's system. Here, assume that Abby upgrades her video drivers from a website. Abby navigates to the web site and clicks on the link to the driver.exe file. The file is downloaded and the executable install broker (i.e. the broker mechanism) prompts Abby to ensure she trusts the executable and wishes to install it. If approved by Abby, the installation completes successfully and Abby continues to browse securely.

Assume now that Abby visits her favorite web site. A new menu control has been added, so the browser needs to install the control. Abby is prompted to ask if she trusts the control, and to authorize the installation. If approved, the control installs and Abby continues navigating the site and browsing securely.

Exemplary Computing System

Figure 6:
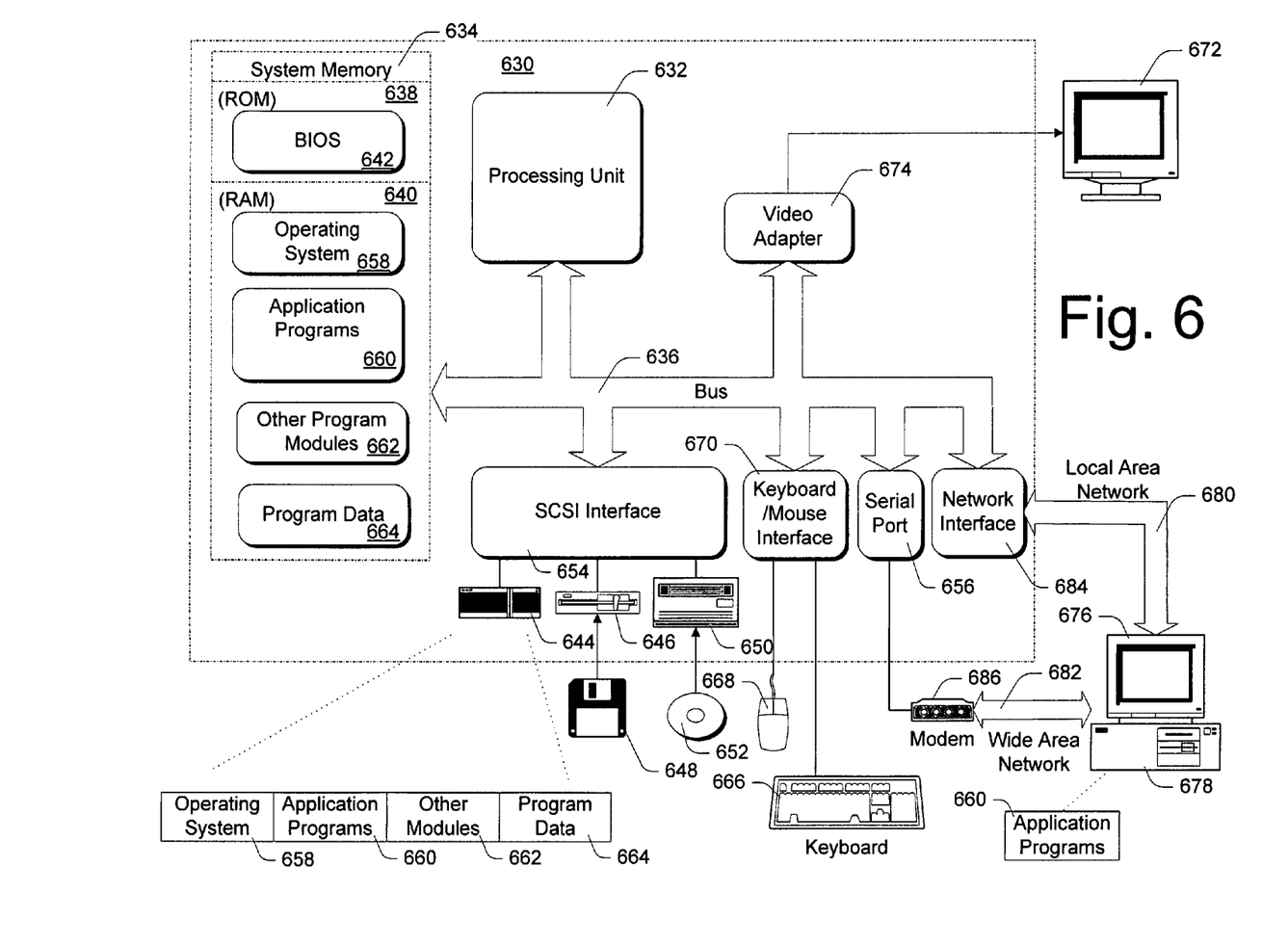
FIG. 6 is a block diagram of a client computing device in accordance with one embodiment.

FIG. 6 shows an exemplary computer system having components that can be used to implement one or more of the embodiments described above.

Computer system 630 includes one or more processors or processing units 632, a system memory 634, and a bus 636 that couples various system components including the system memory 634 to processors 632. The bus 636 represents one or more of any of several types of bus structures, including a memory bus or memory controller, a peripheral bus, an accelerated graphics port, and a processor or local bus using any of a variety of bus architectures. The system memory 634 includes read only memory (ROM) 638 and random access memory (RAM) 640. A basic input/output system (BIOS) 642, containing the basic routines that help to transfer information between elements within computer 630, such as during start-up, is stored in ROM 638.

Computer 630 further includes a hard disk drive 644 for reading from and writing to a hard disk (not shown), a magnetic disk drive 646 for reading from and writing to a removable magnetic disk 648, and an optical disk drive 650 for reading from or writing to a removable optical disk 652 such as a CD ROM or other optical media. The hard disk drive 644, magnetic disk drive 646, and optical disk drive 650 are connected to the bus 636 by an SCSI interface 654 or some other appropriate interface. The drives and their associated computer-readable media provide nonvolatile storage of computer-readable instructions, data structures, program modules and other data for computer 630. Although the exemplary environment described herein employs a hard disk, a removable magnetic disk 648 and a removable optical disk 652, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 644, magnetic disk 648, optical disk 652, ROM 638, or RAM 640, including an operating system 658, one or more application programs 660, other program modules 662, and program data 664. A user may enter commands and information into computer 630 through input devices such as a keyboard 666 and a pointing device 668. Other input devices (not shown) may include a microphone, joystick, game pad, satellite dish, scanner, or the like. These and other input devices are connected to the processing unit 632 through an interface 670 that is coupled to the bus 636. A monitor 672 or other type of display device is also connected to the bus 636 via an interface, such as a video adapter 674. In addition to the monitor, personal computers typically include other peripheral output devices (not shown) such as speakers and printers.

Computer 630 commonly operates in a networked environment using logical connections to one or more remote computers, such as a remote computer 676. The remote computer 676 may be another personal computer, a server, a router, a network PC, a peer device or other common network node, and typically includes many or all of the elements described above relative to computer 630, although only a memory storage device 678 has been illustrated in FIG. 6. The logical connections depicted in FIG. 6 include a local area network (LAN) 680 and a wide area network (WAN) 682. Such networking environments are commonplace in offices, enterprise-wide computer networks, intranets, and the Internet.

When used in a LAN networking environment, computer 630 is connected to the local network 680 through a network interface or adapter 684. When used in a WAN networking environment, computer 630 typically includes a modem 686 or other means for establishing communications over the wide area network 682, such as the Internet. The modem 686, which may be internal or external, is connected to the bus 636 via a serial port interface 656. In a networked environment, program modules depicted relative to the personal computer 630, or portions thereof, may be stored in the remote memory storage device. It will be appreciated that the network connections shown are exemplary and other means of establishing a communications link between the computers may be used.

Generally, the data processors of computer 630 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The embodiments described above can reduce the security risks associated with applications that have access to the Internet, while at the same provide users with safe, rich experiences.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
  launching an Internet-application that inherits privileges of a token associated with a user, the token including a user integrity level associated with the user;
  providing a blocking mechanism that is configured to block the Internet-application's access to defined spaces of a client computing device on which the Internet-application executes, the defined spaces including an administrative space and a user space of the client computing device, and the providing a blocking mechanism comprising:
    setting an administrative space integrity level that is higher than the user integrity level to restrict the Internet-application from accessing the administrative space;
    setting a user space integrity level that is higher than the user integrity level to restrict the Internet-application from accessing the user space;
    defining a containment zone in which the Internet-application is to write and read data;
    setting a containment zone integrity level that is lower than or equal to the user integrity level to allow the Internet-application to access the containment zone;
  launching, as a result of the user's interaction with the Internet-application, an unrestricted Internet-application that is unblocked by the blocking mechanism, the unrestricted Internet-application associated with an additional token that is configured to enable the unrestricted Internet-application to access the administrative space and the user space; and
  defining an additional containment zone in which the unrestricted Internet-application is to read and write data, the Internet-application being restricted from accessing the additional containment zone and the unrestricted Internet-application being restricted from accessing the containment zone.

2. The method of claim 1, wherein the blocking mechanism is configured block access in a user-independent manner.

3. The method of claim 1 further comprising logically interposing a broker mechanism between the Internet-application and the defined spaces to broker access to the defined spaces.

4. The method of claim 3, wherein the broker mechanism comprises individual broker objects, each of which being associated with a different defined space.

5. The method of claim 3, wherein the broker mechanism is configured to enable a user to approve access to an associated defined space.

6. The method of claim 1, wherein the Internet-application comprises a web browser application.

7. A computer-implemented method comprising:
  launching an Internet-application that inherits privileges of a token associated with a user, the token including a user integrity level associated with the user;
  providing a token-based blocking mechanism that is configured to block the Internet-application's access to at least the administrative and user spaces of a client computing device on which the Internet-application executes, the providing a token-based blocking mechanism comprising:
    setting an administrative space integrity level that is higher than the user integrity level to restrict the Internet-application from accessing the administrative space;
    setting a user space integrity level that is higher than the user integrity level to restrict the Internet-application from accessing the user space;
    defining a containment zone in which the Internet-application is to write and read data;

setting a containment zone integrity level that is lower than or equal to the user integrity level to allow the Internet-application to access the containment zone;

logically interposing an administrative broker object between the Internet-application and the administrative space to broker access to the administrative space;

logically interposing a user space broker object between the Internet-application and the user space to broker access to the user space;

launching, as a result of the user's interaction with the Internet-application, an unrestricted Internet-application that is unblocked by the blocking mechanism, the unrestricted Internet-application associated with an additional token that is configured to enable the unrestricted Internet-application to access the administrative space and the user space; and defining an additional containment zone in which the unrestricted Internet-application is to read and write data, the Internet-application being restricted from accessing the additional containment zone and the unrestricted Internet-application being restricted from accessing the containment zone.

8. The method of claim 7, wherein the user space broker object is configured to enable a user to approve access to the user space.

9. The method of claim 8, wherein the administrative broker object is configured to prompt an administrative user to enter associated credentials in order to access the administrative space.

10. The method of claim 7, wherein the Internet-application comprises a web browser application.

11. A computing device comprising:
one or more processors;
one or more hardware computer-readable storage media, associated with the one or more processors and embodying computer-readable instructions which, when executed, cause the computing device to perform a method comprising:
launching an Internet-application that inherits privileges of a token associated with a user, the token including a user integrity level associated with the user;
providing a blocking mechanism that is configured to block the Internet-application's access to defined spaces of the computing device on which the Internet-application executes, the defined spaces including an administrative space and a user space of the computing device, and the providing a blocking mechanism comprising:
setting an administrative space integrity level that is higher than the user integrity level to restrict the Internet-application from accessing the administrative space;
setting a user space integrity level that is higher than the user integrity level to restrict the Internet-application from accessing the user space;
defining a containment zone in which the Internet-application is to write and read data;
setting a containment zone integrity level that is lower than or equal to the user integrity level to allow the Internet-application to access the containment zone;
launching, as a result of the user's interaction with the Internet-application, an unrestricted Internet-application that is unblocked by the blocking mechanism, the unrestricted Internet-application associated with an additional token that is configured to enable the unrestricted Internet-application to access the administrative space and the user space; and
defining an additional containment zone in which the unrestricted Internet-application is to read and write data, the Internet-application being restricted from accessing the additional containment zone and the unrestricted Internet-application being restricted from accessing the containment zone.

12. The computing device of claim 11, wherein the blocking mechanism is configured block access in a user-independent manner.

13. The computing device of claim 11, wherein the method further comprises logically interposing a broker mechanism between the Internet-application and the defined spaces to broker access to the defined spaces.

14. The computing device of claim 13, wherein the broker mechanism comprises individual broker objects, each of which being associated with a different defined space.

15. The computing device of claim 13, wherein the broker mechanism is configured to enable a user to approve access to an associated defined space.

16. The computing device of claim 11, wherein the Internet-application comprises a web browser application.

* * * * *

UNITED STATES PATENT AND TRADEMARK OFFICE
CERTIFICATE OF CORRECTION

| | | |
|---|---|---|
| PATENT NO. | : 8,078,740 B2 | Page 1 of 1 |
| APPLICATION NO. | : 11/145530 | |
| DATED | : December 13, 2011 | |
| INVENTOR(S) | : Franco et al. | |

It is certified that error appears in the above-identified patent and that said Letters Patent is hereby corrected as shown below:

Title page, in Item (73), under "Assignee" column 1, line 1, delete "CA" and insert -- WA --, therefor.

Signed and Sealed this
Fourteenth Day of February, 2012

David J. Kappos
*Director of the United States Patent and Trademark Office*